United States Patent Office 2,827,454
Patented Mar. 18, 1958

2,827,454

METHOD OF RECOVERING CHLOROPHYLL

Gustav Jean Nord, Asheville, N. C.

No Drawing. Application February 5, 1954
Serial No. 408,601

7 Claims. (Cl. 260—210.5)

This invention relates to an improved method of treating plants of the genus Agave, more particularly to treating the *Agave lechuguilla* to produce valuable technical products therefrom and particularly a saponin concentrate and a chlorophyll concentrate.

The *Agave lechuguilla* grows abundantly in the southwest area of the United States, particularly in west Texas and New Mexico. The plant attained historical significance centuries ago because of the excellent character of the fiber produced from its leaf. This fiber, generally known as Tula Ixtle fiber is still being produced in Mexico to a not inconsiderable extent and is characterized by physical properties such as tensile strength, moisture and fungicidal resistance that is scarcely surpassed by any other known natural fiber.

The novelty and technological efficacy of the present invention will be more readily appreciated by a consideration of a preferred treatment of the species *Agave lopantha* Schiede, not because the concepts of the invention are limited to this particular species but rather because this species is in abundant supply in continental United States and is characteristically representative of other members of this genus from which technological valuable products may be produced, including but not necessarily limited to high grade textile fibers, concentrated chloroplast pigments, saponaceous concentrates and the like.

The *Agave lechuguilla* plant, in many respects, presents itself as an ideal chemurgic crop in certain areas of this country. It grows abundantly in the wild or natural state in the Southwest areas of the country. The plant is exceptionally hardy or vigorous and is inherently resistant to prolonged drought and sharp frost. While it thrives best on limestone soil, it nevertheless grows abundantly on hillsides, ridges and tableland which have but a modicum of lime in the soil. In fact, the plant is so hardy that it constitutes a real clearance problem in respect to the areas to which it is indigenous.

This plant has practically no agronomic value although, as will be pointed out, it constitutes a most profitable chemurgic crop. Animals will eat it sometimes but practically only during periods of prolonged drought. It is not a feed of choice largely because of the impaction resulting from the abundant content of long and strong and chemically resistant fiber in the leaf. To date, therefore, this plant has constituted a nuisance problem and stockmen and farmers would avidly welcome its removal to make place for more nutritious grasses and vegetable growth which could be utilized. The plant grows thickly and abundantly, so thickly, in fact, that in many areas of growth, the area covered becomes practically impassable to cattle.

The present invention is based fundamentally on the concept that the *Agave lechuguilla* constitutes a very important and profitable chemurgic crop. To effectuate this concept, a process has been devised which insures the economic production of a number of technological valuable products including, but not inherently limited to high strength, resistant textile fibers, saponaceous concentrates and chlorophyll-containing plant pigment concentrates.

The novel process of the invention will be described primarily in respect of its efficacy and utility as a method of producing chlorophyll concentrates which, by known methods, can be worked up into refined products of pharmaceutical or technological acceptance. The immediately produced chlorophyll-containing fraction may directly enter certain uses as, for example, in soap stocks, camouflage paints, antiknock adjuvants and the like. The initial chlorophyll-containing concentrate, produced as hereinafter described, may be further concentrated or refined by the orthodox methods or sequential selective solvent extraction (e. g. hexane and acetone) to produce the substantially pure insoluble chlorophyll free or substantially free from its accompanying pigment cogeners (carotenoid, xanthophyll etc.) which chlorophyll, by known methods, may be converted to the water-soluble derivatives currently employed in the pharmaceutical fields, as for example, chlorophyllin, sodium copper chlorin-e and the like.

The invention can readily be evaluated from a specific consideration of typical methods of procedure which have been devised to produce certain technically valuable co-products, particularly saponaceous and chlorophyll concentrates. It might be noted, at this point, the process contemplates the treatment of the whole or entire plant, i. e., the bulb or root in which the saponaceous content is largely concentrated and the leafy upper growth containing the high strength fibers and the plant pigments. It also should be noted that from a chemurgic standpoint there is, practically, an inexhaustible supply of the raw material with which this invention is concerned. In most instances, the plant propagates by suckers which grow up from the root-stocks and the scattered seeds each of which accounts for the unusually heavy growth which surrounds the parent plant. There is another characteristic of the plant which is of considerable import in respect to the present invention. The *Agave lechuguilla* is the only plant of the Agave species that will readily sprout from the root when the original leaves are cut off from the base. After such cutting, new leaves will grow quite rapidly and may be harvested again within a period of from approximately 18 to 24 months. The source material may be constituted of wild growing plants or plants derived from cultivated acreage. The yield of valuable products per acre will naturally vary depending on a number of factors, important among which are the general source, i. e., wild growing plants or cultivated plants. As indicative of the technological value of the particular crop, the following facts may be of some moment. In actual field checks, it has been found that the yield per acre of plants range from 1½ to 6 tons per acre.

In describing the process, it is assumed that the top growth or leaves of the Agave are treated, although it will be understood that the entire plant, i. e., including the bulb or root may be processed.

In carrying out the process, the harvested leaves are first subjected to an effective pressing operation as, for example, by passing the material through a roller press mill, and decorticator to be more fully described. The expressed juice is then preferably adjusted to pH 4.2 to 4.8 and is transferred to a holding tank through a steam or hot water jacketed tubular heater or the like, where in its passage it is instantaneously heated to a temperature of between 40° C. and 95° C. This heat treatment forms a precipitate of a grey, chalky consistency and without any coagulation or agglomeration of the chlorophyll and related pigments.

After standing in the holding tank for a short time or until clotting occurs, the insoluble suspended matter is separated from the hot or warm juice by any desired method, as by decantation, filtration or the like.

The hot or warm clarified juice recovered from this filtration step is then discharged into a vessel which is surrounded by a jacket through which cold water or a low temperature refrigerant is circulated to permit of rapid cooling of the juice to room temperature or approximately 30° C. The cooling may also be done by passing the clarified juice through suitable continuous coils externally cooled by a spray or immersion pool of a coolant such as water or other low temperature refrigerant.

After cooling, the clarified juice is then treated with a reagent which will coagulate and/or precipitate a chlorophyll-containing solid. It has been found that this may readily be done by adding a minor amount, and of the order of 0.5 percent of borax to the solution and agitating vigorously for a brief period of about ten minutes more or less. The addition of borax whose action is accelerated by the intimate mixing caused by agitation, produces a flocculent precipitate containing the chloroplast or chlorophyll-carotenoid and related pigments of the plant structure.

It has been found that the chlorophyll is present in individual or small groups of molecules that dart about distributing themselves uniformly throughout the juice and it is believed that borax brings about their flocculation owing to removal of the protective colloids attached to the chlorophyll particles.

The liquor, treated as above described, is then subjected to filtration or centrifugation to separate the coagulated or precipitated chlorophyll-containing solids from the liquor. In the usual circumstances the separated solids contain of the order of 1% chlorophyll. This separated solid may be treated by known methods such as sequential extraction by selected solvents such as petroleum hydrocarbons and ketones to produce a chlorophyll fraction of a high degree of concentration or purity which may be marketed as such or which may be converted to water-soluble derivatives.

The filtrate from the chlorophyll-containing precipitate is then heated to 85° C. to recover the proteinaceous solids which, upon cooling, are precipitated. These solids may be further treated and worked up in suitable form for an animal feed or may be treated to separate specific protein fractions such as one high in glutamic acid.

Cooling and separation of the proteinaceous solids may be carried out in the same manner as described for the clarified juice prior to the chlorophyll recovery, and the resulting filtrate is then treated in any desired manner to segregate and recover the saponin content in the desired degree of concentration. The filtrate, for example, may be passed through a multiple effect evaporator or equivalent dehydration unit to produce a concentrated syrup or it may be passed directly or after preliminary evaporation to a spray drying and dried to a powder.

If a saponin concentrate of optimum value is desired, the filtrate, before spray drying may be further extracted with suitable solvents to remove residual colorimetric pigments, waxes and the like.

It will be understood that the borax addition may be made either in the form of a solution or as a solid. It will be understood, also, that it is added in an amount of from 0.1% to 1.5% on the dry weight of the juice.

The procedural steps comprehended under the invention may be modified within a wide permissive latitude. Thus, the borax may be added to the cold expressed juice without prior heating and after the precipitation of chlorophyll, the filtrate may be heated and treated for the recovery of saponin as indicated previously. The proteinaceous solids which are separated out from the juice by adjustment to the isoelectric point and coagulation may be further treated to work it up in suitable form for an animal feed or may be treated to separate specific protein fractions such as one high in glutamic acid.

In a modification of the process, the expressed juice may be flash heated to a temperature of the order of from 40° C. to about 95° C. in a period of about one-half minute, more or less, and about 0.1% borax added with agitation. The resulting material is then subjected to any suitable liquid-solids separation method, as in a filter. The filter cake containing the chloroplast pigments and associated insoluble materials may be treated by any effective conventional method, as by sequential solvent extraction with solvents like acetone and hexane, to recover chlorophyll enriched fractions and other valuable cogenitor pigment products.

The filtrate from the above separation may be treated to produce a saponaceous concentrate. This may be done by multiple effect evaporation, spray drying and the like.

It has been found that if preservation of the expressed juice is desirable, for whatever reason, this may readily be done by adding formaldehyde in the approximate proportion of 0.5% formalin on the juice. Such stabilized juice may be flash dried to a powder which subsequently may be processed to secure desired fractions from such powder.

As indicated previously, the *Agave lechuguilla* not only provides an excellent source material for the production of saponaceous products and valuable readily recoverable plant pigments, but it is also a source of fibers of technical value. The preferred mode of operation under the present invention, therefore, envisages an operation in which the several valuable components of the juice may be separated and recovered but also a form of processing of the leaves by which the fibers may be recovered in excellent physical condition to provide a very valuable coproduct of the process.

In the preferred operation, the raw material is treated in a novel manner to insure a high yield of these fibers in optimum physical condition. The improved operation to be described, as will be appreciated subsequently, assures an efficient recovery of saponaceous materials and the components of the chloroplast and also the production of the natural fibers in a technologically usable form and of excellent physical characteristics. As will be seen, the operation is so designed as to remove these fibers from their naturally associated materials in undegenerated form, i. e., without chemical decomposition or physical degradation.

Major factors in achieving the primary objectives of the invention is to insure a juicing of the leaves and to separate and segregate the fibers from associated pulp or binder material with minimum mechanical break-up or disintegration of the fibers. This has been achieved under the present invention by a special correlation of an improved juicing and decortication technique.

In the preferred operation, the harvested leaves are subjected to a pressing operation which effectively expresses the juice with minimal disruption of the structure of the fibers. This is best achieved by passing the leaves between a series of rolls which break down the indurated outer structure of the leaf and effectively ruptures the internal cells to press out or extract the natural juice which latter is optionally treated by the several methods described hereinbefore. Preferably such juice extraction is accomplished by passing the leaves through a series of "two high" rolls the desired pressure in which is achieved by adjustment of the top roll towards the subjacent roll by suitable means such as a hydraulic ram. This enables the application of controllable heavy pressure on the leaves between the rolls and not only ruptures the internal vesicular cell structure but also results in a spreading or detachment of the long staple fibers which spreading facilitates subsequent separating of the fibers from the natural pulp encasement. In other words, the applied heavy pressure, achieved in this manner, expresses the juice and breaks down or weakens the natural binder between the fibers thereby to improve or facilitate subsequent decortication of the fibers. The rationale of this treatment is to thoroughly juice the leaves and to substantially free the fibers from the interposed adhering pulp without bruising, cutting or destroying the cellular structure of the fibers.

The fibers may be further treated by known methods to render them amenable to the production of the particular textile or cordage products desired.

The value of the *Agave lechuguilla* as a chemurgic crop will now be fully appreciated. It may readily be processed in accordance with the concepts and procedures of this invention to produce at least three products of technological value, all of which are in high and constant demand. As pointed out previously, this plant may be raised in areas and on land which are not suited to the production of typical agricultural crops. The striking economics of the operation herein discussed can be quickly apprehended from a consideration of the fact that a plant, utilizing the methods described herein and treating 6000 annual tons of *Agave lechuguilla* leaves, can produce at a substantial profit approximately 1500 tons of clean fiber, 350 tons of technical grade saponin and 125 tons of crude chlorophyll-containing pigment. The technological values of the proposed methods are, therefore, quite obvious.

While preferred modifications of the invention have been described, it will be understood that these are given didactically to illustrate the underlying principles involved and not as limiting the useful scope of the invention to the described particular illustrative embodiments.

I claim:

1. A method of treating the *Agave lechuguilla* plant to produce valuable technical products therefrom which comprises pressing the harvested leaves of such plant to express the juice therefrom; initially treating the juice with a reagent, said reagent being an aqueous solution of a borate salt, to precipitate and to separate a chloroplast solid fraction and a saponin-containing liquid fraction.

2. A method of treating the *Agave lechuguilla* plant to produce valuable products therefrom which comprises expressing the juice from the leaves of such plant adjusting the juice to a pH of from about 4.2–4.8; flash heating the juice at a temperature of the order of from about 40° C. to 95° C. for a very brief period of time to coagulate a substantial amount of the proteinaceous content of the juice; separating the coagulated protein from the solution; and cooling the clarified solution before treating such solution with a sufficient amount of an aqueous solution containing a borate to precipitate a chlorophyll-containing plant pigment fraction, separating the precipitated pigment and evaporating the filtrate to recover a concentrated saponin-containing fraction.

3. A method of treating the *Agave lechuguilla* plant to produce valuable technical products therefrom which comprises pressing the harvested leaves of such plant to express the juice therefrom; adjusting the juice to a pH between 4.2 and 4.8; heating the juice quickly to a temperature of the order of from 40° C. to 95° C. to coagulate the proteinaceous content; separating the coagulated material from the juice; cooling the juice and agitating the separated solution with substantially 0.5% of a borate salt in an aqueous solution for a period of time sufficient to form a precipitate of chloroplast pigments; separating the precipitate from the solution, and treating the separated solution to produce a saponin-rich fraction therefrom.

4. A method in accordance with claim 3 in which the borate is borax.

5. A method in accordance with claim 3 in which the expressed juice is heated to a temperature of about 90° C. within a period of about one-half a minute.

6. A process in accordance with claim 3 in which the filtered juice is agitated with the borate for a period of about 10 minutes.

7. A method in accordance with claim 3 in which the chloroplast-containing precipitate is subjected to selective solvent extraction to produce a chlorophyll-rich fraction.

References Cited in the file of this patent

UNITED STATES PATENTS

| | | |
|---|---|---|
| 2,098,110 | Schertz et al. | Nov. 2, 1937 |
| 2,121,210 | Nord | June 21, 1938 |
| 2,131,394 | Test | Sept. 27, 1938 |
| 2,383,561 | Petering et al. | Aug. 28, 1945 |
| 2,428,740 | Mann | Oct. 7, 1949 |
| 2,561,617 | Fortman | July 24, 1951 |
| 2,722,039 | McCrae | Nov. 1, 1955 |

OTHER REFERENCES

Steroidal Sapogenins, XV, Dept. of Agriculture, Bulletin AIC 367, June 1954, pages 2, 3 and 4.

Journal Gen. Physiology, vol. 24, 565–582 (pp. 571–2 and 577 only used).